United States Patent [19]

Hamamoto et al.

[11] 3,897,477

[45] July 29, 1975

[54] METHOD OF PREPARING DIAMINOMALEONITRILE

[75] Inventors: Yoshito Hamamoto; Hideo Shirakawa; Kazuhiko Aida; Yutaka Omura; Tosiaki Takagi; Kozo Nakao; Takuo Kawaguchi; Haruo Nagai, all of Nakajyo-machi, Japan

[73] Assignee: Kyowa Gas Chemical Industry Co. Ltd., Tokyo, Japan

[22] Filed: Dec. 11, 1973

[21] Appl. No.: 423,768

[30] Foreign Application Priority Data

Dec. 19, 1972 Japan.............................. 47-127904
Dec. 27, 1972 Japan.............................. 48-51873
Dec. 27, 1972 Japan.............................. 48-51973

[52] U.S. Cl.......................................... 260/465.5 R
[51] Int. Cl.......................................... C07c 121/02

[58] Field of Search.............................. 260/465.5 R

[56] References Cited
UNITED STATES PATENTS

| | | | |
|---|---|---|---|
| 3,564,039 | 2/1971 | Webster | 260/465.5 R |
| 3,629,318 | 12/1971 | Webster | 260/465.5 R |
| 3,701,797 | 10/1972 | Okada et al | 260/465.5 R |

*Primary Examiner*—Joseph Paul Brust
*Attorney, Agent, or Firm*—Sherman & Shalloway

[57] ABSTRACT

A method of preparing diaminomaleonitrile which comprises polymerizing hydrogen cyanide in the presence of a compound selected from the group consisting of the oxides, hydroxides and cyanides of alkaline earth metals, using as solvent a member selected from the group consisting of n-methylpyrrolidone, dimethyl sulfoxide and dimethylformamide.

6 Claims, No Drawings

METHOD OF PREPARING DIAMINOMALEONITRILE

This invention to a method of preparing diaminomaleonitrile by polymerizing hydrogen cyanide.

Diaminomaleonitrile (DAMN) is known to be a compound which is not only valuable as a growth promoter of microorganisms and plants but also very useful as a starting material for synthesizing the heterocyclic compounds such as the ring compounds of imidazole, pyrazine and purine, which perform important roles for organisms. The method of synthesizing DAMN known heretofore numbers about ten classes, inclusive of those of a laboratory scale. Among these methods there is one in which DAMN is synthesized by polymerizing hydrogen cyanide (prussic acid) in the presence of either an oxide, hydroxide or cyanide of an alkali metal, using as solvent either dimethyl sulfoxide or dimethylformamide (Jananese Patent Publications Nos. 35044/69 and 62691/69). Since the yield of DAMN according to this method is nearly 60%, it has been attracting attention recently. However, this method has the following drawbacks.

1. The amounts used of the hydroxide or cyanide of the alkali metal, the catalyst, are great.
2. The reaction time is long when the foregoing catalysts are used.
3. Since the foregoing catalysts are toxic, difficulty is involved in their handling.
4. Since the foregoing catalysts dissolve in the reaction solvent, much difficulty is experienced in separating the DAMN as crystals from the reaction mixture. Again, such troubles as coloration of the crystals of DAMN are brought about as a result of the crystals become admixed with a large amount of catalyst.
5. Great difficulty is experienced in eliminating the cyanide ions contained in the high polymer of hydrogen cyanide that forms during the reaction of synthesizing said Damn. And if this high polymer is disosed as such, there is the possibility of causing a pollution problem. Hence, the treatment of said high polymer involves a great amount of expense.

As a consequence of our extensive researches with a view to overcoming the foregoing drawbacks and providing a method of obtaining DAMN at a yield at least equal to that obtained by the aforementioned method, we have arrived at the present invention.

According to this invention, DAMN can be prepared in good yield of at least 60%, this being achieved by polymerizing hydrogen cyanide in the presence of either an oxide, hydroxide or cyanide of an alkaline earth metal, using as solvent either n-methylpyrrolidone, dimethyl sulfoxide or dimethylformamide. Moreover, this method has the following advantages, 1. The amount of catalyst used can be decreased. For instance, as against the necessity of using 0.138 mol of the alkali metal compound per mol of hydrogen cyanide, in the case of the alkaline earth metal compounds of the present invention the amount used can be decreased to 0.027 – 0.036 mol per mol of the hydrogen cyanide.
2. The reaction time can be shortened. For instance, the time required for achieving a yield of 50% at a reaction temperature of 70°C. by using 0.138 mol of the alkali metal compounds as catalyst per mol of the hydrogen cyanide is 6 hours, whereas in the case the alkaline earth metal compounds are used as the catalyst, this time is 2.5 hours.
3. Since the toxicity of the alkaline earth metal compounds is low their handling is facilitated.
4. Since the solubility of the alkaline earth metal compounds in hexamethylphosphoryl amide, n-methylpyrrolidone, dimethyl sulfoxide and dimethylformamide is small, not only are these catalysts readily separated from the reaction mixture after the reaction, but also the amount of these catalysts that become admixed in the crude DAMN is small.
5. The cyanide ions contained in the by-product high polymer can be readily removed by merely washing the high polymer in water. This is believed to be possible because of the following reason. That is, the cyanide ion becomes contained in the high polymer usually as a counter ion of the alkali metal or alkaline earth metal. Now, in the case of the alkali metals there is no change at all on washing the high polymer in water. In contrast, in the case of the alkaline earth metals, the high polymer becomes readily decomposed in the hydroxides of the alkaline earth metals and hydrogen cyanide, with the consequence that the cyanide ions are readily removed as hydrogen cyanide.
6. Further, since the alkaline earth metal compounds are less expensive than the alkali metal compounds, DAMN can be prepared at a commercial advantage.

The alkaline earth metal compounds, i.e., the oxides, hydroxides or cyanides of the alkaline earth metals used as catalyst in the present invention, are used in a weight ratio to the hydrogen cyanide of 0.01 – 1.00, and preferably 0.05 – 0.25.

The reaction of this invention is carried out at a temperature ranging from room temperature to 150°C., and preferably 50° to 130°C. If the reaction temperature falls below room temperature, the reaction time is greatly prolonged and, on the other hand, if the reaction temperature exceeds 150°C., side reactions tend to be set up. The reaction pressure used is normal atmospheric pressure. If necessary, superatmospheric pressure may also be used.

In separating the diaminomaleonitrile from the reaction mixture, the usual means of separation such as the extraction and distillation methods are employed.

The following examples will be given for more specifically illustrating the invention.

EXAMPLE 1

One hundred ml of dimethylformamide, 30 ml of HCN and 2 grams of $Ca(OH)_2$ were placed in a 200-ml pressure vessel of glass, after which the vessel was closed, and the mixture was reacted for 4 hours at 70°C. After completion of the reaction, when a part of the reaction mixture was withdrawn, diluted with 20-fold amount of water and the yield of DAMN was determined by means of the ultraviolet absorption spectrum (296 $\mu$), it was 65%.

EXAMPLE 2

When Example 1 was repeated but using 100 ml of dimethylformamide, 30 ml of HCN and 1.5 grams of CaO and carrying out the reaction for 2 hours at 80°C., the yield of DAMN was 60%.

EXAMPLE 3

The experiment was operated as in Example 1, using 100 ml of dimethyl sulfoxide, 46 ml of HCN and 5.0 grams of $Ca(OH)_2$ and carrying out the reaction for 2 hours at 60°C to obtain DAMN at a yield of 67%.

EXAMPLE 4

The experiment was carried out as in Example 1 but using 100 ml of dimethylformamide, 30 ml of HCN and 2.0 grams of $Ba(OH)_2$ and carrying out the reaction for 5 hours at 70°C. to obtain DAMN at a yield of 52%.

EXAMPLE 5

When Example 1 was repeated but using 100 ml of dimethylformamide, 30 ml of HCN and 2.5 grams of $Ca(CN)_2$ and reacting the mixture for 4 hours at 60°C., the yield of DAMN was 65%.

EXAMPLE 6

When the experiment was carried out by following the same procedure as that described in Example 1 but using 66 ml of n-methylpyrrolidone, 20 mml of HCN and 1.5 grams of CaO and carrying out the reaction for 3 hours at 70°C., the yield of DAMN was 71.5%.

What is claimed is:

1. A method of preparing diaminomaleonitrile which comprises polymerizing hydrogen cyanide in the presence of a compound selected from the group consisting of MeO, $Me(OH)_2$ and $Me(CN)_2$, wherein Me is an alkaline earth metal, using as solvent a member selected from the group consisting of n-methylpyrrolidone, dimethyl sulfoxide and dimethylformamide, the weight ratio of said compound to hydrogen cyanide being 0.01 – 1.00, and carrying out the reaction at a temperature ranging from room temperature to 150°C.

2. The method of claim 1 wherein the weight ratio of said compound to hydrogen cyanide is 0.05 – 0.25.

3. The method of claim 1 wherein the reaction is carried out at a temperature ranging from 50° to 130°C.

4. The method of claim 2 wherein the weight ratio of said compound to hydrogen cyanide is 0.07 to 0.16.

5. The method od claim 3 wherein the reaction is carried out at a temperature ranging from 60° to 80°C.

6. The method of claim 1 wherein the said compound is a member of the group consisting of $Ca(OH)_2$, CaO, $Ba(OH)_2$ and $Ca(CN)_2$.

* * * * *